(12) United States Patent
DiGiovanni et al.

(10) Patent No.: US 9,379,512 B2
(45) Date of Patent: Jun. 28, 2016

(54) ARRAYED OPTICAL FIBER AMPLIFIER USING RIBBONIZED ERBIUM-DOPED FIBER

(71) Applicant: OFS FITEL, LLC, Norcross, GA (US)

(72) Inventors: David J DiGiovanni, Mountain Lakes, NJ (US); Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/633,521

(22) Filed: Feb. 27, 2015

(65) Prior Publication Data

US 2015/0295382 A1  Oct. 15, 2015

Related U.S. Application Data

(60) Provisional application No. 61/978,503, filed on Apr. 11, 2014.

(51) Int. Cl.
| | |
|---|---|
| *H01S 3/067* | (2006.01) |
| *G02B 6/44* | (2006.01) |
| *G02B 6/036* | (2006.01) |
| *H01S 3/094* | (2006.01) |
| *H01S 3/23* | (2006.01) |
| *H01S 3/0941* | (2006.01) |
| *H01S 3/16* | (2006.01) |
| *H01S 3/00* | (2006.01) |

(52) U.S. Cl.
CPC ............ *H01S 3/06754* (2013.01); *G02B 6/036* (2013.01); *G02B 6/4404* (2013.01); *H01S 3/06737* (2013.01); *H01S 3/094003* (2013.01); *H01S 3/2391* (2013.01); *H01S 3/0064* (2013.01); *H01S 3/0078* (2013.01); *H01S 3/06766* (2013.01); *H01S 3/09415* (2013.01); *H01S 3/1608* (2013.01)

(58) Field of Classification Search
CPC ............ H01S 3/06754; H01S 3/06737; H01S 3/06766; H01S 3/094003; H01S 3/2391; G02B 6/4403; G02B 6/4404; G02B 6/036
See application file for complete search history.

(56) References Cited

U.S. PATENT DOCUMENTS

| | | | | |
|---|---|---|---|---|
| 6,229,939 | B1* | 5/2001 | Komine ................ | B82Y 20/00 372/6 |
| 6,748,148 | B2* | 6/2004 | Chiasson ............. | G02B 6/4404 385/114 |
| 6,792,184 | B2* | 9/2004 | Conrad ................ | G02B 6/4404 385/114 |
| 6,957,000 | B2* | 10/2005 | McAlpine ............ | G02B 6/4495 385/102 |
| 7,050,688 | B2* | 5/2006 | Lochkovic ........... | G02B 6/4402 385/114 |
| 2002/0131164 | A1* | 9/2002 | Palese .................. | H01S 3/2383 359/349 |
| 2003/0223714 | A1* | 12/2003 | Conrad ................ | G02B 6/4404 385/114 |
| 2004/0086242 | A1* | 5/2004 | McAlpine ............ | G02B 6/4495 385/102 |
| 2011/0274435 | A1* | 11/2011 | Fini ..................... | G02B 6/02042 398/139 |
| 2013/0114130 | A1* | 5/2013 | Stampoulidis ...... | H01S 3/06737 359/341.32 |

* cited by examiner

*Primary Examiner* — Eric Bolda
(74) *Attorney, Agent, or Firm* — Sam Han, Esq.

(57) ABSTRACT

Systems and methods for reducing cost and amplifier module size are disclosed. One system comprises an arrayed optical fiber amplifier that uses a ribbonized fiber that permits reduction of amplifier module size and also reduction in the cost of manufacturing that are not readily achievable in other currently-available systems.

19 Claims, 7 Drawing Sheets

ARRAYED OPTICAL FIBER AMPLIFIER USING RIBBONIZED ERBIUM-DOPED FIBER

CROSS REFERENCE TO RELATED APPLICATIONS

This application claims the benefit of U.S. provisional patent application Ser. No. 61/978,503, filed Apr. 11, 2014 by Zhu, having the title "Arrayed Optical Fiber Amplifiers Using Ribbonized Er-doped Fiber," which is incorporated herein by reference in its entirety.

BACKGROUND

1. Field of the Disclosure

The present disclosure relates generally to fiber optics and, more particularly, to optical fiber amplifiers.

2. Description of Related Art

Internet-related services and applications continue to develop to accommodate increasing data needs of consumers and businesses. As demand for data increases, networks continue to evolve to accommodate those additional demands. Specifically, fiber-optic networks continue to develop to meet the need for more data capacity (amount of data) and the need for higher data rates (speed at which the data is transferred).

SUMMARY

The present disclosure provides arrayed optical fiber amplifier using ribbonized Erbium (Er) doped fibers (EDF). Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
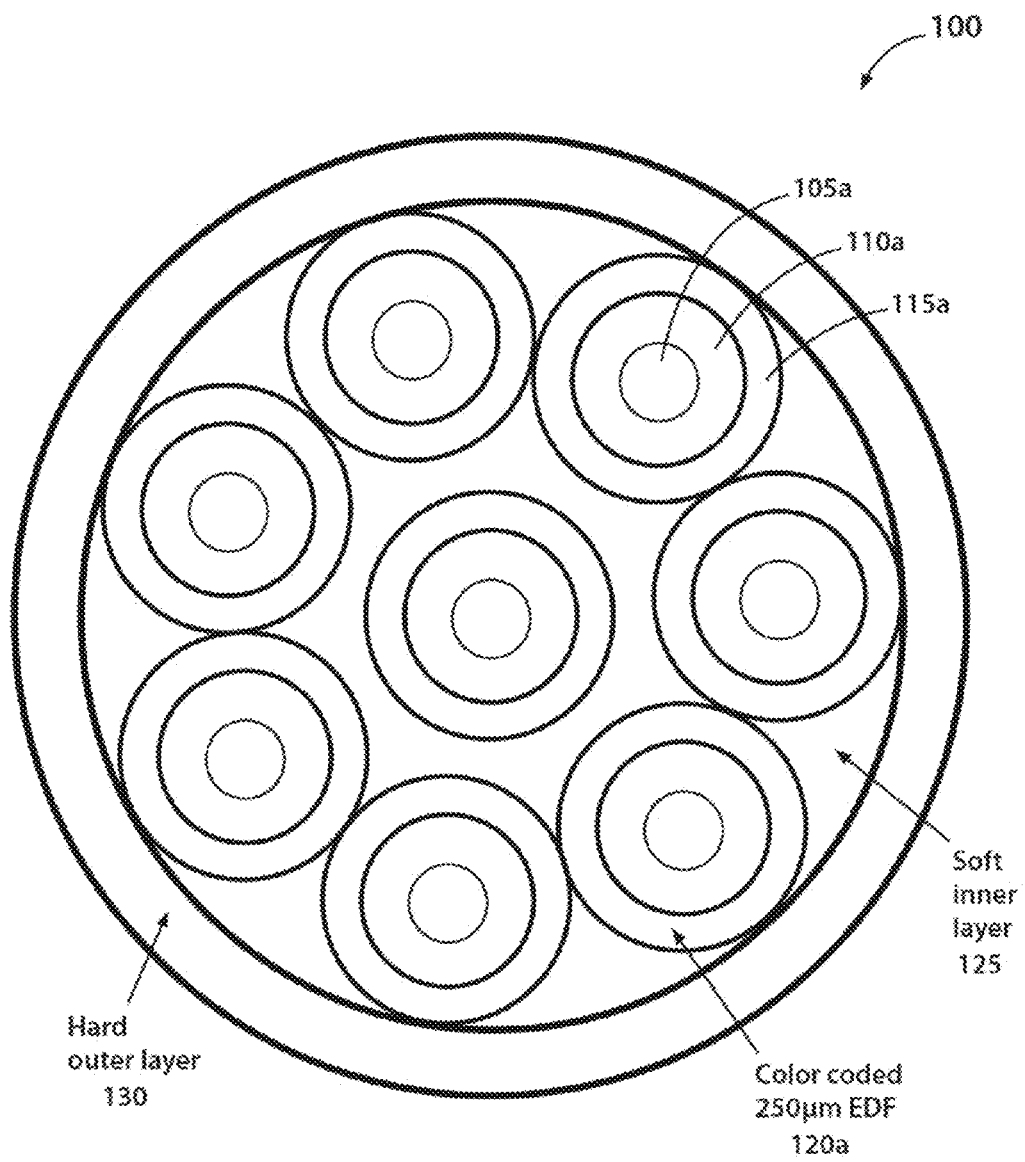
FIG. 1 is a diagram showing a cross-section of one embodiment of ribbonized Erbium (Er) doped fibers (EDF).

Internet services have been spreading rapidly, thereby resulting in increased data traffic. Correspondingly, new applications such as cloud computing have added to the demand for greater flexibility and faster data speeds. Optical networks are now evolving to meet these network demands with more flexible wavelength path routing, switching, and assignments.

In this type of environment, multiple degree reconfigurable optical add/drop multiplexers (ROADM) with colorless, directionless, and contentless (CDC) functions are expected to play an important role for dynamic capacity allocation. However, insertion losses associated with high degree ROADM nodes are generally higher than for basic two-degree nodes. As a result, optical amplifier arrays with 1×8 or 1×16 are often employed to compensate for insertion losses in M×1 wavelength selective switches (WSS) and 1×N optical couplers.

Currently, a number of discrete, separately-pumped Erbium-doped fiber amplifier (EDFA) modules are used as the optical amplifier arrays. However, as the degree of ROADM increases, the ROADM becomes bulky, costly, and inefficient due to the increased number of EDFA modules. For example, if a conventional EDFA module is installed between a 1×4 WSS and 4×1 optical coupler in the CDC ROADM node, then a few hundred discrete EDFA modules would be needed in a single node, thereby making the equipment size and cost undesirable.

The systems and methods described herein seek to address these shortcomings. Generally, the disclosed systems and methods comprise an arrayed optical fiber amplifier that uses a ribbonized gain-doped fiber, such as an Erbium (Er) doped fiber (EDF). Using ribbonized fiber reduces the module size of the amplifier array and also reduces the cost of manufacturing.

With this in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing a cross-section of one embodiment of a ribbonized gain-doped fiber array. As shown in FIG. 1, the ribbonized gain doped fiber array is shown as a ribbon 100 comprising eight (8) color-coded gain-doped fibers, specifically shown as 250-µm EDF. Although an outer diameter of 250 µm is described for the coating, it should be appreciated that the coating diameter for this embodiment can range between approximately 160 µm and approximately 250 µm. Each gain-doped fiber 120a comprises a gain-doped core 105a (e.g., doped with Erbium), a relative low index (compared to the core) cladding layer 110a that surrounds the gain-doped core 105a, and a coating layer 115a that is applied to the cladding 110a. A colored ink layer may be applied over each individual EDF coating for easy identification. The ribbon 100 further comprises a matrix material to contain the gain-doped fibers within a monolithic structure. FIG. 1 illustrates a matrix material consisting of a soft inner layer 125 that surrounds the colored coded gain-doped fibers 120 and a hard outer layer 130 that surrounds the soft inner layer 125. In the particular embodiment of FIG. 1, the gain-doped fibers 120 are arranged in a substantially closely-packed configuration (e.g., a central EDF surrounded by seven (7) color-coated EDFs). Hence, the ribbon EDF can be made compact.

For example in FIG. 1, the ribbon is made by eight (8) individually-coated EDF with 125/250 μm cladding/coating diameter, which results in a ribbon diameter of 1.25 mm. The ribbon EDF is peelable for easy fiber access. The ribbon diameter can be reduced to about 1.0 mm and 0.825 mm by using 125/200 μm, or by using 80/165 μm cladding/coating diameter EDF, respectively.

For some embodiments, the EDF ribbon includes individually-coated EDF with a colored ink applied over each EDF to facilitate easy identification. Preferably, the inner layer 125 is a soft, ultraviolet (UV) cured layer that cushions the gain-doped fibers, while the outer layer 130 is a hard, UV-cured layer that protects the gain-doped fibers. Other well-known ribbon structures can be used, for example, a single polymer matrix material as opposed to separate soft and hard coatings. The ribbon can be flat, with the gain-doped fiber arranged in a linear fashion, or round, with the gain-doped fiber arranged in a close-packed structure. The flat ribbon could be rollable such that it can be shaped into a round structure. Furthermore, to achieve comparable amplification performance, each gain-doped fiber exhibits the same or substantially similar optical properties (e.g., numerical aperture (NA), mode-field diameter (MFD), cutoff wavelength, background loss, etc.)

Figure 2:
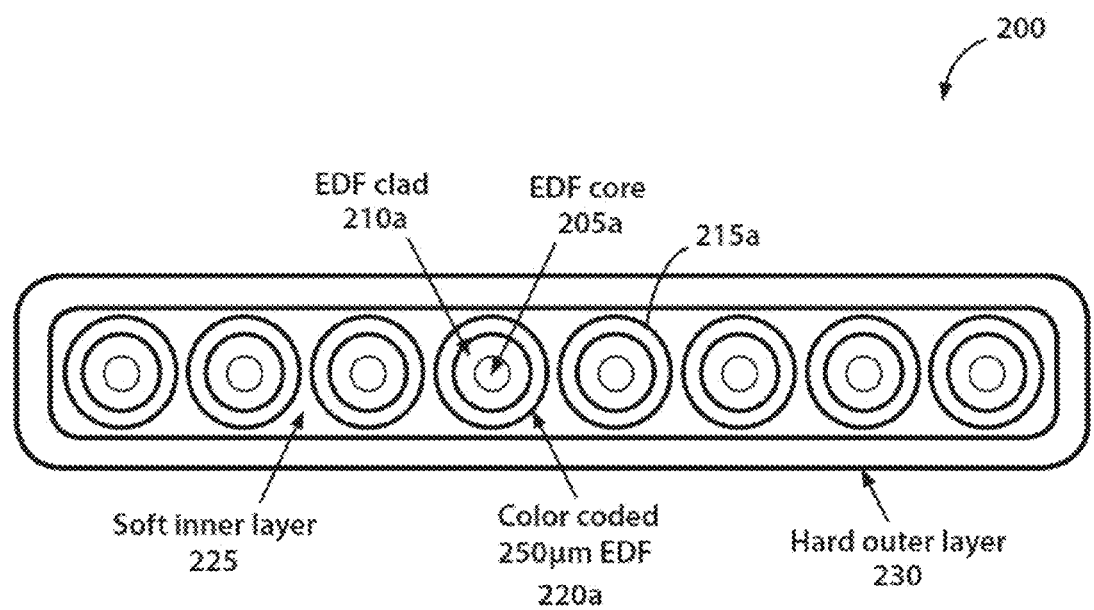
FIG. 2 is a diagram showing a cross-section of another embodiment of ribbonized EDF.

FIG. 2 is a diagram showing a cross-section of another embodiment of ribbonized gain-doped fiber array. As shown in FIG. 2, the gain-doped fiber array comprises a ribbon 200. Unlike FIG. 1, the ribbon 200 of FIG. 2 comprises eight (8) color-coded gain-doped fibers 220a (e.g., 250-μm EDF) that are arranged linearly. Similar to FIG. 1, each gain-doped fiber 220a comprises a gain-doped core 205a, a cladding 210a, and a coating layer 215a. The linear arrangement of gain-doped fibers is surrounded by a soft inner layer 225, which in turn is surrounded by a hard outer layer 230.

Using the ribbonized gain-doped fiber array of either FIG. 1 or FIG. 2 permits manufacture of a more compact amplifier array at lower cost than other currently-available systems. With this in mind, attention is turned to FIGS. 3 through 6, which show different embodiments of arrayed amplifier systems using ribbonized EDF.

Figure 3:
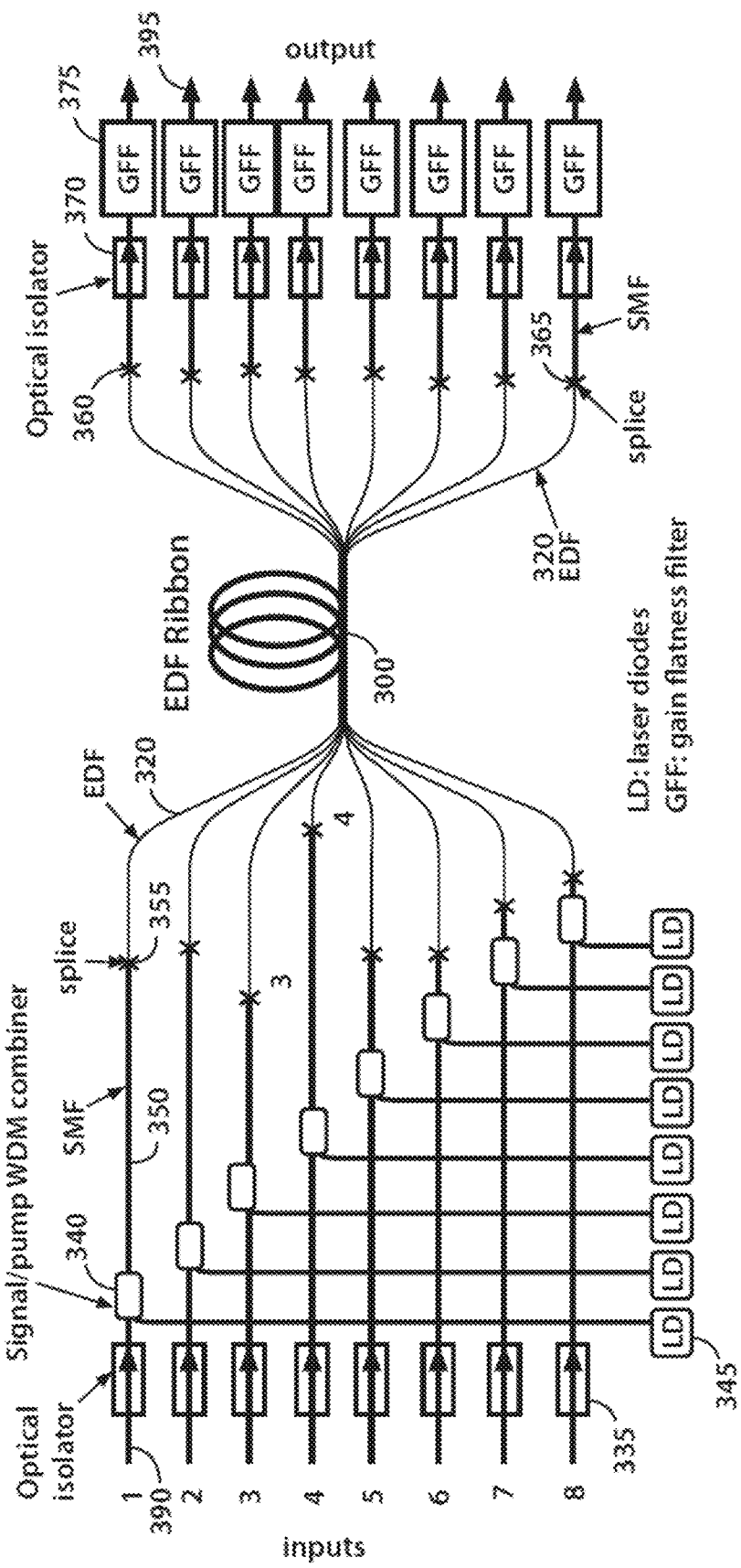
FIG. 3 is a block diagram showing one embodiment of an arrayed amplifier using ribbonized EDF (ribbonized EDFA).

FIG. 3 is a block diagram showing one embodiment of an arrayed amplifier using ribbonized EDF (ribbonized EDFA). As shown in FIG. 3, the ribbonized EDFA system comprises an EDF ribbon 300 with EDFs 320 that are optically coupled to signal inputs 390 and signal outputs 395. In particular, each EDF 320 is optically coupled to a corresponding signal input 390 as well as a corresponding signal output 395.

Tracing the signal path from the inputs 390 to the outputs 395, the signal from the signal input 390 propagates to a corresponding input optical isolator 335, and thereafter to a corresponding signal-pump combiner 340 (e.g., a wavelength division multiplexed (WDM) combiner). The signal-pump combiner 340 is optically coupled to a pump source, such as a laser diode 345 (e.g., 976 nm laser diode), which provides pump power for the signal. Each signal-pump combiner 340 is optically coupled to a corresponding single-mode fiber (SMF) 350 that is optically coupled to a corresponding EDF 320 with a core-matched splice 355, thereby permitting the signal to propagate from the signal-pump combiner 340 to its corresponding EDF 320. For some embodiments, each individual EDF 320 can be separated by peeling a matrix off of the ribbon EDF 300 and then spliced to the signal-pump combiner. Upon amplification (by propagating through the EDF 320), the amplified signal travels through an output optical isolator 370 (which is core-match spliced 360 to the EDF 320 by another SMF 365) and then through a gain-flattening filter (GFF) 375 to finally emerge at its corresponding signal output 395. Other amplifier architectures are possible and are well known in the art. As shown in the embodiment of FIG. 3, using a ribbonized EDF 300 permits a more compact amplifier array that can be manufactured at lower cost than other currently-available systems. Furthermore, it should be noted that the length of each individual EDF in the ribbon can be adjusted to achieve uniformity and consistency of gain shapes among the EDFAs. The flexibility in the lengths of the individual EDFs can also improve production yield of the arrayed EDFA.

The flat gain spectra, and the uniformity and or consistency of the gain shapes in the arrayed EDFA are important for future DWDM transport systems. In order to maintain a high degree of uniformity of gain shapes in arrayed EDFA, precise control of the doping composition and doping concentration are generally required, in addition to precise control of the fiber waveguide structure for each EDF in the ribbon. This is because the gain spectrum of an EDFA depends on the EDF properties such as absorption, MFD, NA, cutoff wavelength, Al-ratio, etc., which are subject to manufacturing variability and the inversion level of the EDF, which will depend on the detailed configuration and operation conditions of the EDFA (such as the length of EDF, pump and signal power level etc). It is well known that the Er-doped silica fibers are typically co-doped with Aluminium (Al), and Lanthanum (La) or Germanium (Ge) that are used to raise the index of refraction and modify the gain spectrum. The Al concentration has the largest influence on the gain spectrum of EDF. The absorption level at 1480 nm is a very sensitive measure of the variation in Al co-dopant concentration in EDF, hence, the ratio between absorption at 1480 nm and the peak absorption, $R_{Al}=\alpha_{1480 nm}/\alpha_{peak}$, called Al-ratio ($R_{Al}$), is chosen as the measurable parameter to differentiate between different aluminum doping levels and monitor for spectrum uniformity/consistency in EDFs. It is preferable to obtain the gain shape variation less than ±1% among the EDFA in the array, and for individual EDF used in EDF ribbon, the Al ratio shall be controlled in a range the $R_{Al}=R_{AL}^{target}\pm0.05$ (or $\Delta R_{Al}\leq 0.01$). For example, if $R_{AL}^{target}=0.432$, then $0.427<R_{Al}<0.437$, or $R_{AL}^{target}$ 0.444, then $0.439<R_{Al}<0.449$. In addition, the individual EDF made for EDF ribbon should have the same properties (such as absorption, emission, MFD, NA, cutoff wavelength, and background loss, etc.) in order to obtain good uniformity of gain shapes. It is preferable that the peak absorption α should be controlled in a range ±3% of target absorption $\alpha^{target}$, for example, $\alpha^{target}$ 6.5 dB/m, then the peak absorption can be in range 6.3 dB/m<α<6.7 dB/m.

An arrayed EDFA by using a 1×8 ribbonized EDF, as described above, has been experimentally demonstrated. Each EDFA in the 1×8 arrayed amplifier was pumped by 976 nm LD in a co-propagation pumping scheme, and a 12 meter length of ribbon EDF was employed. The performance of the arrayed EDFA was evaluated by using 40 DFB diodes as the WDM (with 100 GHz channel spacing) input signals which were combined together by an arrayed waveguide grating routers (AWR) and split into 8 as the input of signals into each individual EDFA in the arrayed amplifier. The composite input signals were adjusted by a variable optical attenuator (VOA) before input to each individual EDFA. The input/output optical isolators, and input/output tap 99/1 taper couplers were used in the experiment, however, the GFF in output was not used. The achievable gain and NF of each individual EDFA were carefully measured and the gain deviations of each EDFA in the arrayed EDFA were also analyzed. The results are shown in FIGS. 7A and 7B.

Figure 7A:
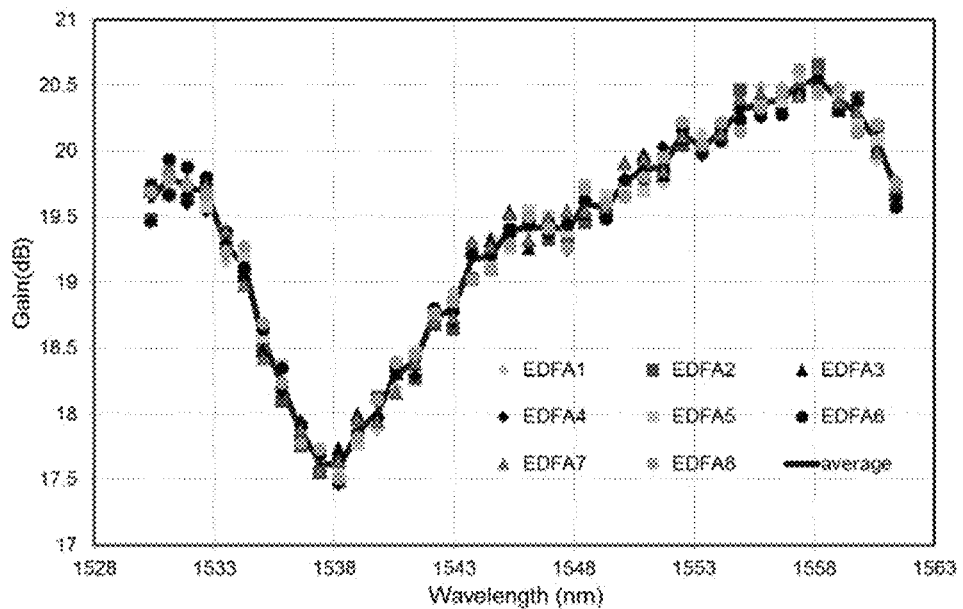
FIG. 7A is a graph showing measured gain of eight (8) EDFA in a 1×8 arrayed EDFA.
Figure 7B:
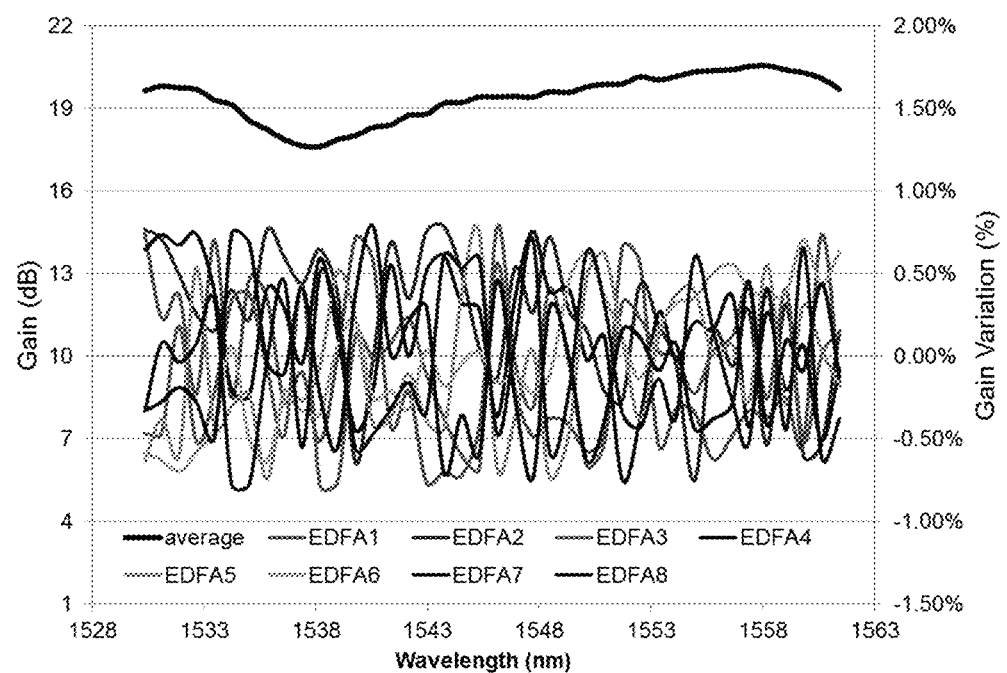
FIG. 7B is a graph showing measured average gain and gain deviation of individual EDFA in a 1×8 arrayed amplifier.

Specifically, FIG. 7A shows the gain curves ranging from wavelength 1530.373 nm to 1561.445 nm from the 1×8 arrayed EDFA. It should be noted that the input powers are adjusted to be the same (2.6 dBm total input power of 40 channels) for all 8 EDFAs, and the pump power of 415 mW for each EDFA in the 1×8 arrayed EDFA were used in this measurement. The average gain of 19.3 dB is obtained with average output power of 21.9 dBm. FIG. 7B plots the average gain of the 8 EDFA and the gain deviation from the averaged gain curve. It can be see that the gain deviations <±0.8% can be obtained, exhibiting excellent gain shape uniformity among the EDFA within the array. The gain deviation can be further reduced by adjusting the length of individual EDF, and slightly adjusting the pump power.

Figure 4:
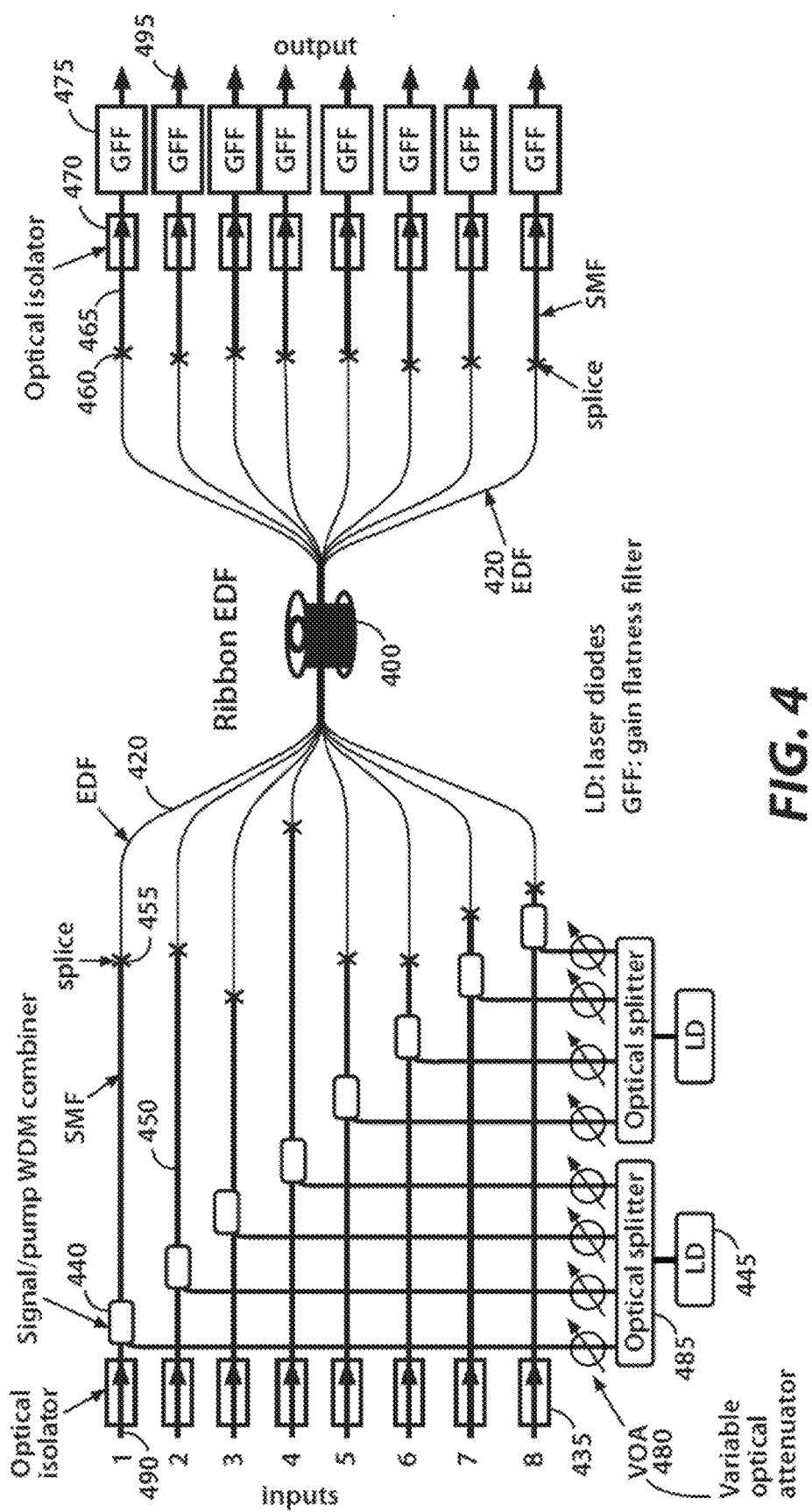
FIG. 4 is a block diagram showing an embodiment of a ribbonized EDFA having shared pumps using optical splitters.

FIG. 4 is a block diagram showing an embodiment of a ribbonized EDFA having shared pumps using optical splitters. Once again, on the input side of the EDF ribbon 400, tracing the signal path from the signal inputs 490 to the signal outputs 495, each signal propagates through its respective input optical isolator 435, signal-pump combiner 440, SMF 450, EDF 420 (coupled to the SMF 450 by a splice 455). Unlike the embodiment of FIG. 3, the embodiment of FIG. 4 provides a pump sharing scheme in which pump power is provided through a combination of pump laser diodes 445, optical splitters 485, and variable optical attenuators (VOA) 480. This type of pump sharing scheme allows for fewer pump sources, with the pump power from the laser diodes 445 being split using optical splitters 485, controlled using the VOA 480, and then provided to the signal through the signal-pump combiner 440.

At the output side, each EDF 420 is optically coupled to a corresponding SMF 465 by a core-matched splice 465. Each SMF 465 is optically coupled to a corresponding output optical isolator 470, which in turn is optically coupled to a corresponding GFF 475, which outputs the amplified signal through its corresponding signal output 495. Insofar as the SMF 465 and GFF 475 are similar to the corresponding components in FIG. 3, further discussion of the SMF 465 and GFF 475 is omitted here. It should, however, be noted that the embodiment of FIG. 4, by employing ribbonized gain-doped fibers, also achieves similar efficiencies and advantages as those described with reference to FIG. 3.

Figure 5:
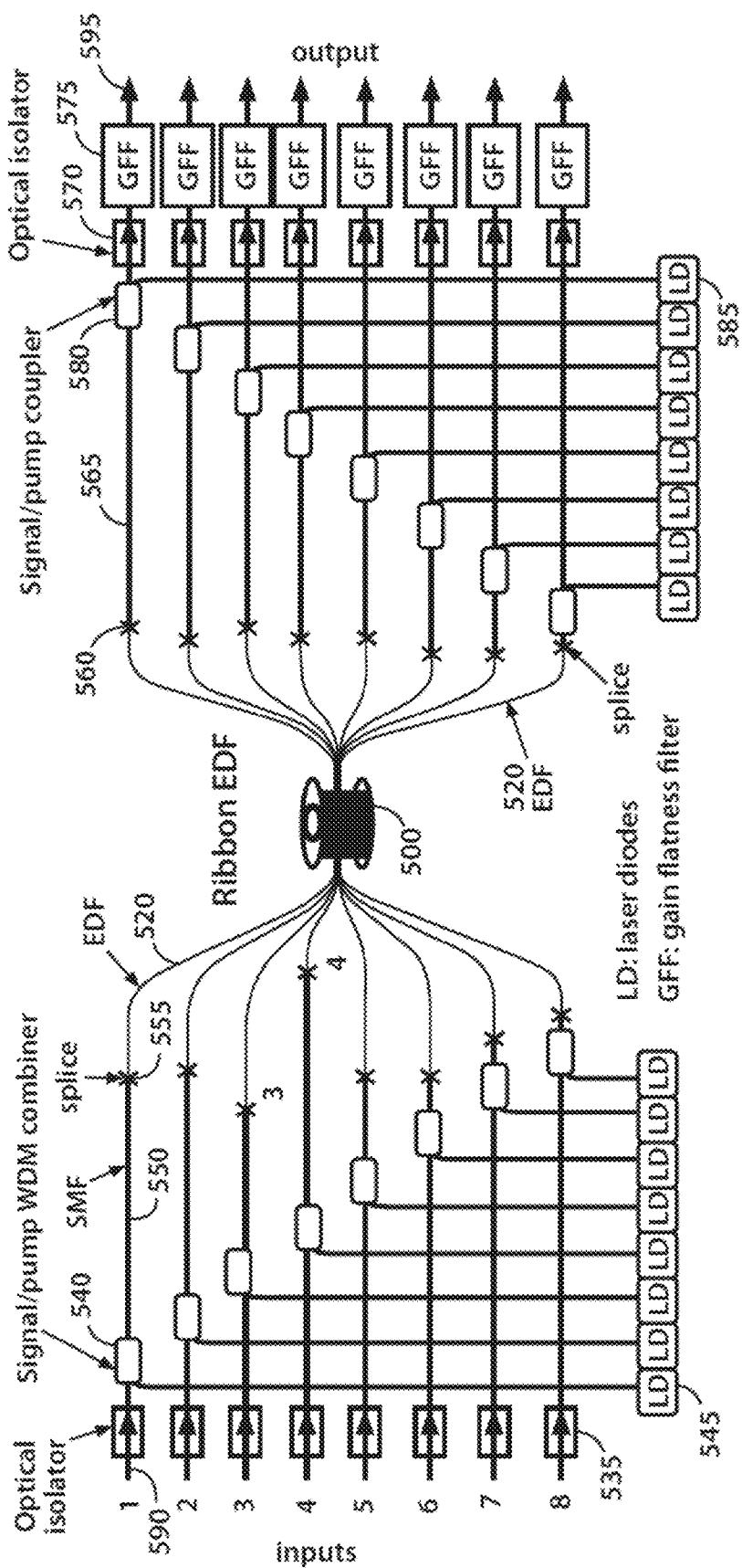
FIG. 5 is a block diagram showing an embodiment of a ribbonized EDFA having both a co-pumping and a counter-pumping configuration.

FIG. 5 is a block diagram showing an embodiment of a ribbonized EDFA having both a co-pumping configuration and a counter-pumping configuration for high output power operation. Similar to the embodiment of FIG. 3, the embodiment of FIG. 5 comprises signal inputs 590, input optical isolators 535, pump laser diodes 545, signal-pump combiners 540, SMF 550, EDF 520 in a ribbonized EDF 500, output optical isolators 570, GFF 575, and signal outputs 595. Insofar as these components have been described with reference to FIGS. 3 and 4 further discussion of these components is omitted here.

Unlike the embodiments of FIGS. 3 and 4, the embodiment of FIG. 5 also includes a counter-pumping scheme, which comprises counter-pumping laser diodes 585, which are optically coupled to their corresponding SMFs 565 by another set of signal-pump combiners 580. Providing both a co-pumping scheme (as described with reference to FIG. 3) and a counter-pumping scheme permits introduction of greater pump power.

Figure 6:
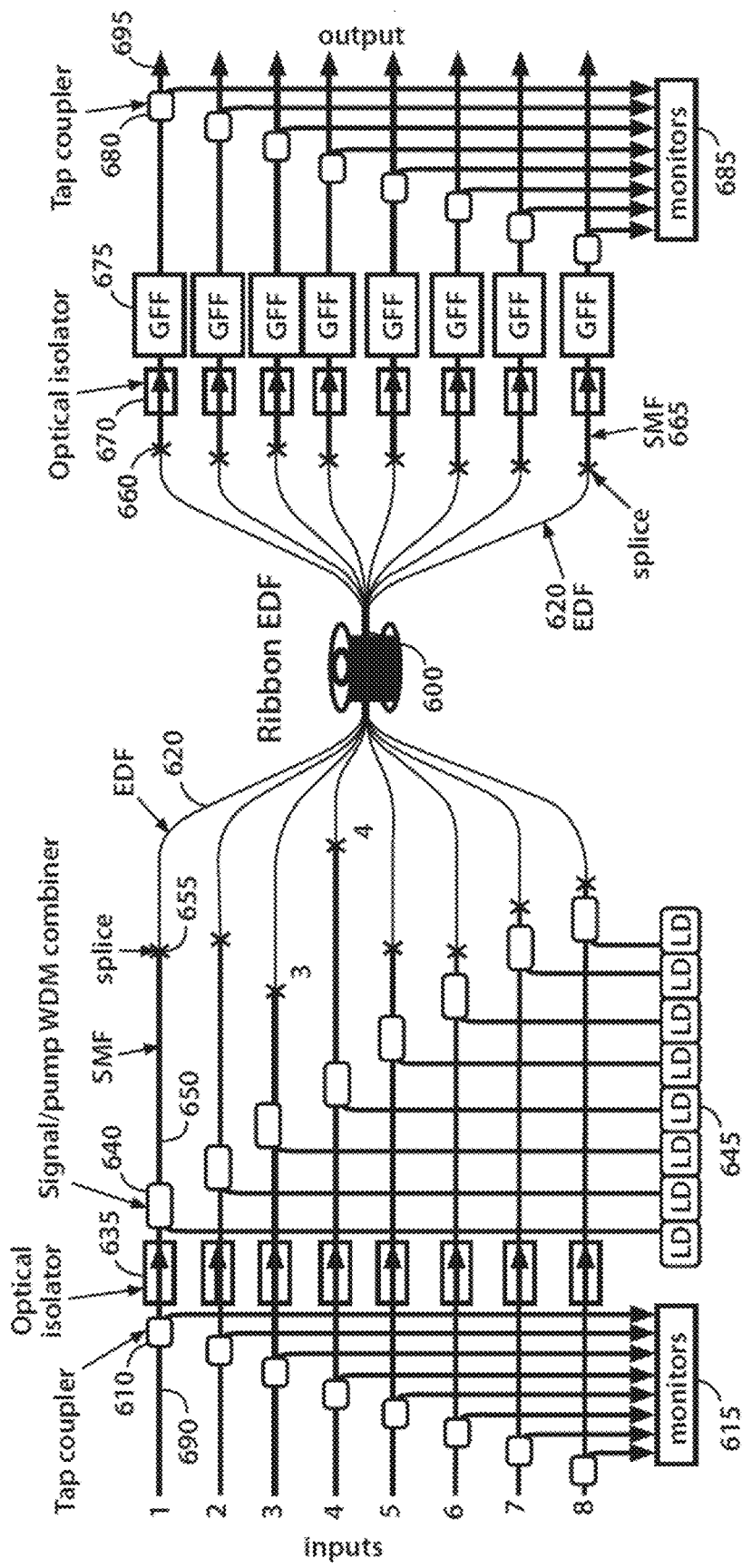
FIG. 6 is a block diagram showing an embodiment of a ribbonized EDFA having power monitors.

FIG. 6 is a block diagram showing an embodiment of a ribbonized EDFA having power monitors. Similar to the embodiment of FIG. 3, the embodiment of FIG. 6 comprises signal inputs 690, input optical isolators 635, signal-pump combiners 640, pump laser diodes 645, SMF 640, EDF 620 in a ribbonized EDF 600, output optical isolators 670, GFF 675, and signal outputs 695. Since these components are discussed with reference to FIGS. 3, 4, and 5 further discussion of these components is omitted here. However, in addition to the components that are common from FIG. 3, the embodiment of FIG. 6 includes input monitors 615 and output monitors 685. The input monitors are optically coupled to the signal inputs 690 with input tap couplers 610, thereby permitting input power measurements. Similarly, the output monitors 685 are optically coupled to the signal outputs 695 with output tap couplers 680, thereby permitting output power measurements.

As shown in the embodiments of FIGS. 1 through 7B, the disclosed systems and methods comprise an arrayed optical fiber amplifier that uses a ribbonized fiber that permits reduction of amplifier module size and also reduction in the cost of manufacturing that are not readily achievable in other currently-available systems.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A system, comprising:
    signal inputs;
    signal outputs; and
    a ribbon, comprising:
        a ribbon matrix material; and
        gain-doped fibers located within the ribbon matrix material, each gain-doped fiber being optically coupled to a corresponding signal input, each gain-doped fiber further being optically coupled to a corresponding signal output, each gain-doped fiber comprising:
            $R_{Al}$ within approximately ±0.05 of a target $R_{Al}$;
            α being within approximately ±3% of a target absorption;
            a gain-doped core;
            a cladding surrounding the gain-doped core; and
            a coating layer surrounding the cladding.

2. The system of claim 1:
    the cladding having an outer diameter of between approximately 80 μm and approximately 125 μm; and
    the coating layer having an outer diameter of between approximately 160 μm and approximately 250 μm.

3. The system of claim 1, the ribbon being a peelable ribbon.

4. The system of claim 1, further comprising:
    means for providing pump power.

5. The system of claim 1, further comprising:
    pump sources optically coupled to the signal inputs, the pump sources for providing pump power through WDM couplers.

6. The system of claim 5, the pump sources being arranged in a co-pumping scheme.

7. The system of claim 5, the pump sources being arranged in a counter-pumping scheme.

8. The system of claim 5, the pump sources being shared pump diodes.

9. The system of claim 1, the gain-doped fibers being color-coded.

10. The system of claim 1, the gain-doped fibers being arranged linearly in the ribbon.

11. The system of claim 10, the ribbon comprising eight (8) color-coded Erbium-doped fibers (EDFs) arranged linearly.

12. The system of claim 1, the gain-doped fibers being arranged in a substantially closely-packed configuration.

13. The system of claim 1, the gain-doped fibers being Erbium-doped fibers (EDFs).

14. The system of claim 1, further comprising:
output monitors optically coupled to the signal outputs.

15. A fiber array, comprising:
gain-fibers, each gain-fiber comprising:
a cladding having an outer diameter of between approximately 80 μm and approximately 125 μm;
a coating having an outer diameter of between approximately 160 μm and approximately 250 μm;
$R_{Al}$ within approximately ±0.05 of the target $R_{Al}$; and
α being within approximately ±3% of a target absorption.

16. The fiber array of claim 15, further comprising a peelable ribbon.

17. The fiber array of claim 15, the EDFs being color-coded.

18. The fiber array of claim 15, the EDFs being arranged linearly.

19. The fiber array of claim 15, the EDFs being arranged in a substantially closely-packed configuration.

\* \* \* \* \*